United States Patent Office 3,028,938
Patented Apr. 10, 1962

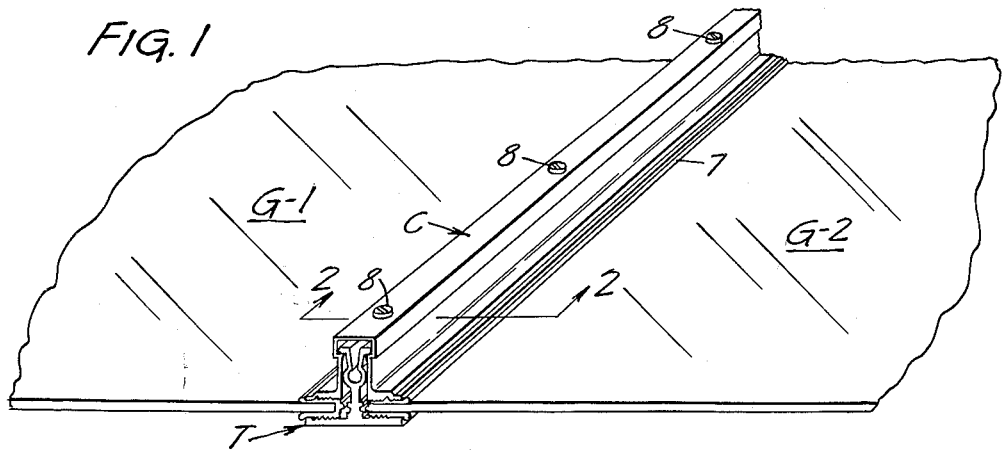
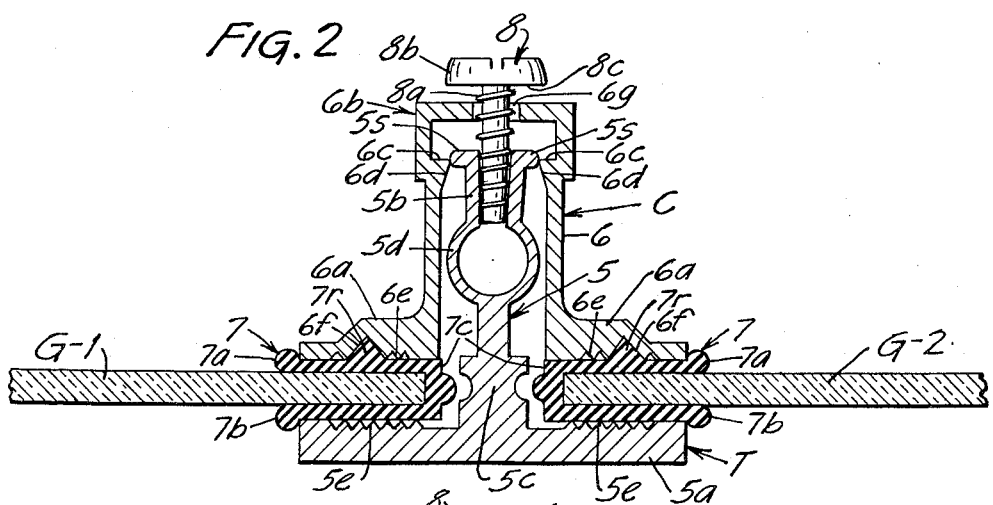
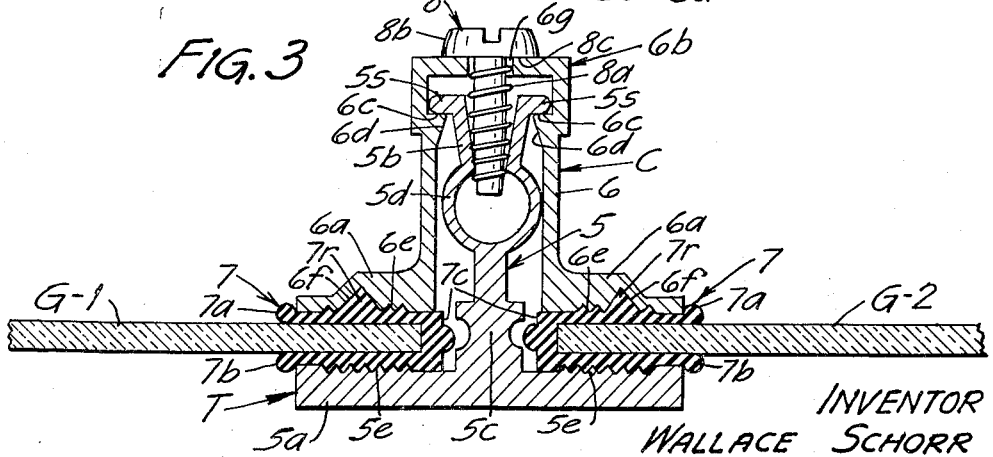

3,028,938
LOCKED JOINT AND REINFORCING CONSTRUCTION FOR FRAGILE SHEET MATERIAL
Wallace Schorr, 4412 Morningside Road, Minneapolis 16, Minn.
Filed Mar. 12, 1959, Ser. No. 799,020
7 Claims. (Cl. 189—36)

This invention relates to a locked joint construction for efficiently interconnecting and reinforcing a plurality of pieces of relatively fragile sheet material such as glass, plastics and other various types of transparent or transluscent compositions. While the structure of my invention is particularly well adapted for the roofs and walls of buildings such as greenhouses, factories, poultry houses and studios where light penetration is desired, it has wide utility in bulding structure where it is desirable to join and reinforce areas of rather fragile composition or sheet material to prevent breakage or uncoupling thereof during extreme and varying weather conditions. My invention is equally applicable for use on curtain walls of the new type of office and other buildings and for office, shop or school partition work.

Heretofore aluminum alloy joint and reinforcing constructions have been attempted for greenhouses and the like which require the juncture and anchorage of a multiplicity of transparent or transluscent frangible sheets, usually glass, but serious difficulties were encountered because of the high coefficient of expansion of the aluminum producing oftentimes shattering of the glass or disconnection of the beams or reinforcing members during temperature extremes in most cimates.

It is an object of my invention to provide a locked joint construction for efficiently interconnecting the marginal edges of relatively fragile sheet materials such as glass, plastics and thin compositions, whereby despite extreme ambient temperature conditions, high winds or rains, the frangible sheets of material will be effectively joined with sealed effect and will not fracture along the joined edges because of contraction or expansion of the main interlocked rails or beam.

A further object is the provision of sealed joint and reinforcing construction of the class described which lends itself particularly well to use of very light relatively inexpensive metals such as aluminum and aluminum alloy while accomplishing the objects and improved results previously enumerated.

More specifically it is an object to provide a sealed joint construction of the class described which for each joint comprises an elongated, expanding T-rail and a cooperating and interlocking longitudinal cap bar with simple but highly efficient means for positively interlocking said two cooperating elements while simultaneously exerting a clamping force between opposed flanges or jaws provided by the two members and with further provision of compressible and elastic sealing means or liners interposed between the cooperating clamping surfaces and the relatively fragile marginal portions of the sheets to be joined.

A further feature of the invention is the provision of sealed joint construction as set forth in the preceding paragraph wherein the compressible elastic liner elements are securely anchored against lateral displacement in the opposed clamping surfaces of the two principal components of the locked joint construction.

It is a still further object to provide in joint structure of the class described an expanding T-rail closely cooperating with a bar-cap of generally inverted U-shape in cross section, with extremely simple means readily applicable exteriorly of the bar cap for expanding a longitudinal terminal portion of the T-rail to interlock the two principal members of the joint construction while simultaneously effecting clamping relation between opposed clamping flanges of the two members.

These and other advantages of my invention will more fully appear from the following description made in connection with the accompanying drawings wherein like reference characters refer to similar parts throughout the several views and in which:

FIG. 1 is a fragmentray perspective view showing interconnection of two sheets of relatively fragile material such as glass through an embodiment of my invention, the principal parts of which are constructed from aluminum alloy metal;

FIG. 2 is a vertical cross section taken along the line 2—2 of FIG. 1 after the T-rail and cap bar have been initially applied with compressible elastic liners of my invention to the marginal edges of two sheets of glass and before interlocking and expansion of the elements has been effected; and FIG. 3 is a similar vertical section showing the principal parts of my joint construction positively interlocked with the marginal edges of the glass sheets securely clamped and sealed.

In the embodiment of my invention illustrated an elongated T-rail is provided indicated as an entirety by the letter T and constructed of substantially rigid but preferably somewhat resilient material such as aluminum alloys, bronze and even some of the stiff, reinforced plastics having a main longitudinal web 5, to the inner portion of which outturned and angled longitudinal base clamping flanges 5a are rigidly affixed and preferably integrally formed therewith, web 5 as shown extending perpendicularly to said flanges.

It will of course be understood that the base flanges 5a may be variously angled with respect to the central outstanding web 5 to facilitate joining sheets of material where a predetermined angulation between the sheets is desired. The main longitudinal web 5 is longitudinally bifurcated at its outer portion to provide the opposed bifurcations 5b which as shown are interconnected with the heavier base portion 5c of the web through the intermediary of opposed longitudinal semi cylindrical intermediate portions 5d which in the form shown, perform definite combinative functions in the overall joint structure as will be later described.

Adjacent the outer longitudinal extremities of the bifurcations 5b, longitudinally outturned locking shoulders 5s are integrally provided preferably having rounded longitudinal edges to facilitate engagement and subsequent locking with cooperating locking shoulders provided by an elongated locking-bar-cap indicated as entireties by the letter C.

My locking-bar-cap may conveniently be constructed of similar materials to those employed for the T-rail "T" and comprises a longitudinal, substantially rigid channel of inverted, generally U-shaped cross section having integrally formed or rigidly attached to the inner portions or legs of the U, longitudinally and substantially rigid outturned clamping flanges 6a, each adapted in operation of my device to cooperate with one of the clamping flanges 5a of the T-rail. Said flanges 6a are angled with respect to the main leg portions 6 of the bar-cap in desired angulation thereto to be disposed generally parallel with the cooperating clamping flanges 5a of the T-rail. The outer longitudinal portion of the channel locking-bar-cap C forms a longitudinal head 6b of generally rectangular cross section with the longitudinal sides or leg portions 6 of the channel being opposed and defining longitudinal offset locking shoulders 6c which at the sides thereof as shown, have narrow, longitudinal, outwardly converging bearing surfaces 6d for engagement with the rounded edges of the outturned locking shoulders 5s of the bifurcations of the T-rail.

In FIGS. 2 and 3 of the drawings, my T-rail and locking-bar-cap construction is shown as applied to a pair of rectangularly cut, glass sheets G-1 and G-2 to interconnect with sealed effect, marginal edges of the same and to reinforce and protect the joint.

My invention preferably includes for each of the joined edges of the relatively fragile material, an elastic and somewhat compressible longitudinal liner clip 7 which may be constructed of tough elastic plastic materials or suitable rubber composition and molded or otherwise formed of channel shape and of elongated U-shaped cross section having as shown, at the outer extremities of the U, longitudinal beads 7a which are disposed in accordance with the width of the leg portions 7b of the clips just outwardly of the longitudinal edges of the clamping flanges 5a and 6a of the T-rail and cap members. The outer surfaces of the T-rail-clamping flanges 5a as shown, are provided with a plurality of longitudinally and sharply angled corrugations 5e which in the clamping action later to be described, longitudinally indent and lock with the compressible associated surfaces of the liner clip 7. The opposing clamping flange 6a of the bar-cap member C is preferably provided with one or more longitudinal grooves 6f preferably of V-shaped cross section for accommodatiton and interlocking with a symmetrically shaped longitudinal locking ridge 7r integrally formed on an outward leg 7b of each liner clip 7 and if desired to increase distribution of clamping anchorage, two or more longitudinal corrugations 6e may be provided in the clamping flanges 6a of the bar-cap to indent and positively engage the associated surfaces of the clip liners.

The construction of the clamping and interlocking elements of my T-rail and bar-cap previously described with the combinative relationship of the clamping flanges with the compressible elastic liner clips, together with the interlocking features of the two rigid members hereafter to be described is particularly effective to permit light metals such as aluminum alloys to be employed for the construction of the T-rail and bar-cap even though such metals have relatively large co-efficients of temperature expansion.

To accommodate maximum compression of the liner clips 7, an optional construction is illustrated in FIGS. 2 and 3 consisting in longitudinal concave grooves 5g formed in the respective longitudinal sides of the base portion 5c of the main outstanding web 5 of the T-rail for accommodating thickened, central, longitudinal rounded beads 7c which protrude inwardly from the U-base portions of the liner clip 7.

To draw the T-rail and bar-cap members together thereby exerting clamping pressure against the sides of the clip liners and indirectly through said liners against the marginal edges of the fragile sheets to be joined, suitable mechanism is employed which preferably in its draw and clamping action will produce spreading apart of the outer extremities of the bifurcations 5b of the T-rail to produce thereafter, a positive interlocking of the longitudinal locking shoulders 5s of the T-rail with the locking shoulders 6c of the locking-bar-cap. While certain equivalent mechanism or means could be utilized which will produce a simultaneous spreading of the bifurcations 5b of the T-rail, with the drawing of T-rail and cap members together, I prefer to employ as shown, a series of tapered wedging and clamping screws indicated as entireties by the numeral 8, having relatively sharp spiraled threads or projections 8a which when the screws are rotatably driven, cut their own internal threads in the opposed inner surfaces of bifurcations 5b while simultaneously they (to the full taper of the screws 8) wedge apart and spread said bifurcations and the external locking shoulders 5s provided near the outer extremities thereof. Screws 8 have enlarged heads 8b defined at their inner ends by circular planar surfaces 8c which when they are fully driven to place, smoothly engage and seal against the external longitudinal flat webs of the head portions 6b of the bar-cap.

In FIG. 2 I illustrate the positioning of the parts of my improved structure before the T-rail and bar-cap are drawn together and before clamping pressure is applied to the fragile sheets G-1 and G-2 through the intermediary of the elastic clip liners 7. The assembly of the parts as positioned in FIG. 2 is very easily accomplished by even unskilled workmen, it being assumed that the T-rail has been previously interconnected at end portions thereof or at least supported (not shown). The sheets G-1 and G-2 at the straight marginal edges to be joined are first equipped with the appropriate liner clips 7 which merely are slipped upon said edges and are preformed dimensionally to so fit. In this connection elasticity of the liner clips makes possible the use of one size for sheets of fragile material varying somewhat in thickness. The fragile sheets G-1 and G-2 at the marginal edges are then laid upon the outer clamping surfaces of the clamping flanges 5a of the T-rail whereafter the locking-bar-cap C is loosely superimposed about the bifurcated outsanding web 5 of the T-rail with the longitudinal V-shaped grooves 6f of the cap-clamping flanges 6a accommodating and interfitting with the locking ridges 7r of the respective and associated liner clips.

The external web of the longitudinal head portion of the cap member has been previously drilled or otherwise provided with spaced screw-receiving apertures 6g spaced apart longitudinally at desired distances such as for example from 6 to 10 inches. The several screws are successively turned and driven with the undersides of the heads 8b in contact with the exterior web of the bar-cap thereby drawing the cap and the T-rail together and simultaneously in the initial drawing action, pulling the rounded shoulders 5s upwardly along the inclined, narrow contact surfaces 6d of the opposing sides of the channel and immediately thereafter spreading the furcations 5b and of course the locking shoulders 5s at the outer marginal edges thereof to expand the said longitudinal shoulders 5s and interpose the same in abutment and positive interlocking against and outwardly of the locking shoulders 6c of the bar-cap head.

In the foregoing operation it is desirable that side walls of the channel bar-cap have slight resiliency which is inherent in aluminum alloy, bronze and other metallic and reinforced plastic materials. With such resiliency, the side walls of the cap may momentarily slightly flex to facilitate the drawing together of the T-rail and cap and will thereafter return to normal position with the locking shoulders 6c producing the positive interlocking of cap and T-rail.

While the outwardly bulged, semi-tubular portions 5b intermediate of the outstanding web 5 of the T-rail are not essential in my improved construction, they do provide strong spring portions to facilitate flexure and expansions of the bifurcations 5b and they further function to provide external, partially cylindrical reinforcements for the opposed sides or leg portions 6 of the channel bar-cap.

FIG. 3 shows my structure operatively applied with T-rail and bar-cap positively interlocked and completely sealed through the clamping and compression of the clip liners 7.

It will be seen that with my structure when it is operatively applied, complete sealing will be obtained between the marginal edges of the fragile sheets which are joined together through the intermediary of the compressible elastic liner clips 7 and the cooperating clamping flanges 5a and 6a of the T-rail and bar-caps. Thus, the two essentially rigid structural elements T and C are thoroughly sealed to exclude moisture and dust and the screw-receiving apertures 6g at the external webs of the bar-caps are closed and sealed by frictional abutment contact of the planar undersurfaces 8c of the enlarged heads of the screws 8. Said sealed relationship of the parts will continue through outside temperature conditions which may vary from 40 below zero to 140 above zero F., even where metal alloys such as aluminum having a high coefficient of expansion are utilized, the compressibility and elasticity of the liner clips 7 adequately compensating for the relatively slight spaced variations between the cooperating clamping flanges 5a and 6a in such wide temperature variations.

From the foregoing description, it will be seen that I have provided a locked joint construction employing an expanding T-rail and a cooperating locking-bar-cap which very efficiently and economically joins, reinforces and seals marginal edges of substantially fragile sheet material such as glass, plastics, ceramics and other sheet compositions. Rigid clamping surfaces will never shatter the joined marginal edges of such fragile sheets even through wide temperature variations nor with the intermediary of the anchored elastic liner clips, will the sheets become uncoupled from the reinforcing joint structure.

It will further be seen that my reinforcing joint structure is well adapted for use on the curtain walls of modern type office buildings and the like, and is equally applicable for office, shop or school partition work. In such applications, joints may be formed between sheets of metal such as aluminum alloys, fiber composition or plastic.

My construction is particularly adaptable for the employment of light extruded moldings for the T-rail and cap members.

It will of course be understood that various changes may be made in the form, details, arrangement and proportions of the parts without departing from the scope of my invention.

What is claimed is:

1. Joint construction for interconnecting and reinforcing a plurality of pieces of relatively fragile sheet material having in combination an elongated expanding T-rail having outturned base flanges receiving marginal edge portions of pieces of sheet material, said rail including a longitudinal outstanding web extending angularly to said outturned flanges and bifurcated at its outer longitudinal portion to present spaced, longitudinal opposed walls, said bifurcations having adjacent their outer longitudinal edges outturned longitudinal locking flanges, an elongated locking-bar-cap comprising a head portion of generally inverted U-shaped cross section having internal locking shoulders spaced inwardly from the outer longitudinal web of the said U-shaped structure and extending substantially perpendicular to the side walls thereof, said locking-bar-cap at the inner longitudinal edges of the U-shaped cross sectional structure having longitudinal outturned sheet-clamping portions with surfaces opposed respectively to the sheet-receiving flanges of said T-rail and means applied through the outer longitudinal web of said U-shaped locking-bar structure engaging the bifurcated portions of said T-rail to spread said bifurcated portions apart and simultaneously draw the said bar-cap inwardly towards the sheet-engaging flanges of said T-rail thereby causing the locking flanges at the outer edges of said bifurcated portions to override said opposed shoulders of the cap member and to thereafter interlock therewith while clamping action is exerted between the outturned flanges of said T-rail and the outturned sheet-clamping portions of said bar-cap.

2. The structure set forth in claim 1 wherein said last mentioned means comprises a plurality of combined drawing and wedging elements inserted in longitudinally spaced relation through the outer longitudinal web of said U-shaped bar-cap and having tapered inner ends for spreading apart the bifurcated portions of said T-rail and having also means for forcing said T-rail and bar-cap together when said elements are driven inwardly.

3. The structure set forth in claim 1 wherein said last mentioned means comprises a series of longitudinally spaced, tapered screws dimensioned cross sectionally to fit and wedge between the interposing side walls defining said furcations of the T-rail, said screws being applied through longitudinally spaced apertures formed through the outer longitudinal web of said U-shaped bar-cap, the threads of said screws when said screws are drivably turned, drawing said T-rail and said bar-cap together, thereby applying clamping action between the outturned flanges of said T-rail and the outturned sheet-clamping portions of said bar-cap.

4. Joint construction for interconnecting and reinforcing a plurality of pieces of relatively fragile sheet material having in combination an elongated T-rail member having outturned base flanges and including a main outstanding web extending angularly to said outturned flanges and bifurcated for expansion at its outer longitudinal portion, and presenting spaced, longitudinal, opposed walls, said furcations having longitudinal outturned locking flanges, an elongated locking-bar-cap member of generally inverted U-shaped cross section having substantially parallel opposed walls and a terminal longitudinal web interconnecting said walls and having adjacent the ends of said walls opposite to said terminal web, outturned longitudinal clamping flanges opposed respectively to the sheet-receiving flanges of said T-rail member, said locking-bar-cap member having internal longitudinal locking shoulders disposed below the outer longitudinal web thereof, means applied through the terminal longitudinal web of said U-shaped bar-cap member for engagement with the bifurcated portions of said T-rail member to spread said portions and to simultaneously draw said bar-cap member inwardly towards the flanges of said T-rail member and to draw the opposed longitudinal shoulders on the side walls of said bar-cap member into interlocking with the spread bifurcated portions of said T-rail member when said T-rail member and bar-cap member are drawn together and longitudinal liner clips constructed of somewhat compressible and elastic material surrounding the marginal edges of said pieces of sheet material to be joined and having side portions interposed respectively between the covered marginal edges of said sheets and the corresponding and respective outturned clamping flanges of said T-rail member and bar-cap member, thereby cushioning but positively applying clamping pressure to said sheet material.

5. The structure set forth in claim 4 wherein the outturned clamping flanges of one of said members is provided with means for anchoring said clip liners against lateral displacement therefrom.

6. Joint construction for clampingly interconnecting and reinforcing a plurality of relatively fragile sheets, having in combination an elongated T-rail having outturned clamping, base flanges and having a main upstanding, somewhat resilient web, bifurcated at its outer longitudinal portion for terminal expansion thereof, an elongated locking-cap of substantially U-shaped cross section having spaced opposed side walls straddling the upstanding web of said T-rail, said side walls terminating in outturned clamping flanges respectively opposed to and disposed in close spaced relation to the base clamping flanges of said T-rail, the opposed walls of said locking-cap defining therebetween a restricted, shouldered longitudinal portion closely accommodating the longitudinal bifurcated terminal portion of said T-rail before spreading thereof, and a plurality of self-securing clamping and wedging elements such as screws extending through the intermediate portion of said U-shaped locking clamp and into the bifurcated portion of said T-rail and widely spaced longitudinally of said locking-cap for forcing said T-rail and locking-cap together while simultaneously spreading and enlarging the bifurcated portion of said T-rail about the shouldered longitudinal portions of said locking-cap.

7. Joint construction for interconnecting and reinforcing a plurality of sheets of relatively frangible material, having in combination an elongated T-rail provided with out-turned clamping base flanges and having a main upstanding somewhat resilient web extending angularly to said base flanges and bifurcated for flexing-expansion at its outer marginal longitudinal portion and presenting spaced longitudinally opposed walls, said furcations having longitudinally disposed interlocking shoulders formed in the outer faces thereof, an elongated locking-bar-cap of substantially U-shaped cross section having substantially parallel opposed walls and having a transverse longitudinal web interconnecting said walls and having adjacent the terminals of said walls, out-turned longitudinal clamping flanges opposed respectively to the base flanges of said elongated T-rail, the opposed walls of said locking-bar-cap having longitudinally arranged cooperating interlocking shoulders for engagement with said first mentioned interlocking shoulders supplied by said upstanding web of said T-rail, and a plurality of longitudinally spaced wedge-and-draw elements extending through the transverse web of said locking-bar-cap and also into the bifurcated portion of said T-rail for spreading apart said bifurcated portion and for simultaneously forcing said T-rail and locking-bar-cap together to interlock the cooperating shoulders of the walls of said locking-bar-cap with the interlocking shoulders of said bifurcated portion, said wedge-and-draw elements having external engagement projections for gripping the opposed inner walls of said bifurcation.

References Cited in the file of this patent

UNITED STATES PATENTS

| | | |
|---|---|---|
| 866,644 | Green | Sept. 24, 1907 |
| 1,988,647 | Emerson et al. | Jan. 22, 1935 |
| 2,073,277 | Hohl | Mar. 9, 1937 |
| 2,845,154 | Duffield | July 29, 1958 |

FOREIGN PATENTS

| | | |
|---|---|---|
| 536,270 | Canada | Jan. 29, 1957 |